(12) United States Patent
Crear et al.

(10) Patent No.: US 10,406,633 B2
(45) Date of Patent: *Sep. 10, 2019

(54) SELECTIVE MODIFICATION OF BUILD STRATEGY PARAMETER(S) FOR ADDITIVE MANUFACTURING

(71) Applicant: General Electric Company, Schenectady, NY (US)

(72) Inventors: Donnell Eugene Crear, Simpsonville, SC (US); Michael Evans Graham, Slingerlands, NY (US); Tao Jia, Greenfield, WI (US); Mohammed Mounir Shalaby, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/677,406

(22) Filed: Aug. 15, 2017

(65) Prior Publication Data

US 2019/0054566 A1 Feb. 21, 2019

(51) Int. Cl.
*B23K 26/342* (2014.01)
*G06F 3/12* (2006.01)
(Continued)

(52) U.S. Cl.
CPC ........ *B23K 26/342* (2015.10); *B23K 15/0026* (2013.01); *B23K 15/0086* (2013.01);
(Continued)

(58) Field of Classification Search
CPC ..... B23K 26/342; B23K 26/082; B33Y 50/02
See application file for complete search history.

(56) References Cited

U.S. PATENT DOCUMENTS

| 5,130,064 A | 7/1992 | Smalley et al. |
| 6,694,207 B2 | 2/2004 | Darrah et al. |

(Continued)

FOREIGN PATENT DOCUMENTS

| EP | 2875897 B1 | 5/2015 |
| WO | 2015132096 A1 | 11/2015 |
| WO | 2016079496 A2 | 5/2016 |

OTHER PUBLICATIONS

U.S. Appl. No. 15/677,417, Office Action dated Jun. 1, 2018, 48 pages.

(Continued)

*Primary Examiner* — Vincent H Tran
(74) *Attorney, Agent, or Firm* — Dale Davis; Hoffman Warnick LLC

(57) ABSTRACT

A computerized method, system, program product and additive manufacturing (AM) system are disclosed. Embodiments provide for modifying object code representative of an object to be physically generated layer by layer by a computerized AM system using the object code. The computerized method may include providing an interface to allow a user to manually: select a region within the object in the object code, the object code including a plurality of pre-assigned build strategy parameters for the object that control operation of the computerized AM system, and selectively modify a build strategy parameter in the selected region in the object code to change an operation of the computerized AM system from the plurality of pre-assigned build strategy parameters during building of the object by the computerized AM system.

21 Claims, 9 Drawing Sheets

(51) Int. Cl.
*B33Y 50/02* (2015.01)
*B23K 26/06* (2014.01)
*B23K 26/082* (2014.01)
*B23K 26/073* (2006.01)
*B23K 15/00* (2006.01)
*B23K 15/02* (2006.01)
*B23K 26/70* (2014.01)
*G06F 3/0484* (2013.01)
*B23K 101/00* (2006.01)

(52) U.S. Cl.
CPC .......... *B23K 15/02* (2013.01); *B23K 26/0608* (2013.01); *B23K 26/073* (2013.01); *B23K 26/082* (2015.10); *B23K 26/70* (2015.10); *B33Y 50/02* (2014.12); *G06F 3/1204* (2013.01); *G06F 3/1253* (2013.01); *B23K 2101/001* (2018.08); *G06F 3/04842* (2013.01); *G06F 3/04847* (2013.01)

(56) References Cited

U.S. PATENT DOCUMENTS

| | | | |
|---|---|---|---|
| 10,022,914 B2* | 7/2018 | Hemani | G06T 19/00 |
| 2007/0168923 A1* | 7/2007 | Connor | G06F 17/50 717/104 |
| 2008/0255809 A1 | 10/2008 | Ran et al. | |
| 2009/0157478 A1* | 6/2009 | Yang | G06Q 30/02 705/7.29 |
| 2012/0133080 A1 | 5/2012 | Moussa et al. | |
| 2014/0140882 A1* | 5/2014 | Syassen | B22F 3/003 419/53 |
| 2015/0004046 A1 | 1/2015 | Graham et al. | |
| 2015/0088292 A1 | 3/2015 | Inoue et al. | |
| 2015/0165691 A1 | 6/2015 | Mark et al. | |
| 2015/0174827 A1* | 6/2015 | Schwarze | B22F 3/1055 700/120 |
| 2015/0197064 A1 | 7/2015 | Walker et al. | |
| 2015/0328839 A1 | 11/2015 | Willis et al. | |
| 2016/0167160 A1 | 6/2016 | Hellestam | |
| 2016/0236416 A1 | 8/2016 | Bheda et al. | |
| 2016/0271881 A1* | 9/2016 | Bostick | G05B 15/02 |
| 2016/0374431 A1* | 12/2016 | Tow | B33Y 30/00 36/43 |
| 2017/0011137 A1* | 1/2017 | Mahdavi | G06F 17/50 |
| 2017/0129184 A1* | 5/2017 | Buller | B33Y 10/00 |
| 2017/0173883 A1 | 6/2017 | Gray et al. | |
| 2017/0173889 A1 | 6/2017 | Thomas-Lepore et al. | |
| 2017/0210078 A1 | 7/2017 | Fortunato | |
| 2017/0304894 A1 | 10/2017 | Buller | |
| 2018/0047208 A1* | 2/2018 | Marin | G06T 11/001 |
| 2018/0141123 A1* | 5/2018 | Revanur | B33Y 50/00 |
| 2018/0144516 A1* | 5/2018 | Pri-Tal | G06T 11/008 |
| 2018/0193959 A1* | 7/2018 | Marchione | B33Y 10/00 |
| 2018/0290241 A1 | 10/2018 | McClelland et al. | |

OTHER PUBLICATIONS

"What Makes 3DXpert Ideal for Metal Additive Manufacturing?" 3D Systems, n.d, 8 pages.
"EOSPrint 2.0: Intuitive, Open and Productive Cam Tool for Industrial 3D Printing: With the new version of EOS' job and process management software, engineers can easily optimize CAD data for EOS systems", EOS Press Release, 2017, 3 pages.
How CAD/CAM Programs Work, Thomasnet.com, n.d, 3 pages. <http://www.thomasnet.com/articles/custom-manufacturing-fabricating/cad-cam-software-explanation>.
U.S. Appl. No. 15/677,417, Final Office Action dated Dec. 26, 2018, 21 pages.
U.S. Appl. No. 15/677,417 Final Office Action dated Dec. 26, 2018, 17 pages.
U.S. Appl. No. 15/677,426, Office Action dated Feb. 11, 2019, 23 pages.
U.S. Appl. No. 15/677,417, Notice of Allowance dated Feb. 27, 2019, 11 pages.
U.S. Appl. No. 15/677,426, Notice of Allowance dated May 14, 2019, (Geen-0983-US3), 13 pages.

* cited by examiner

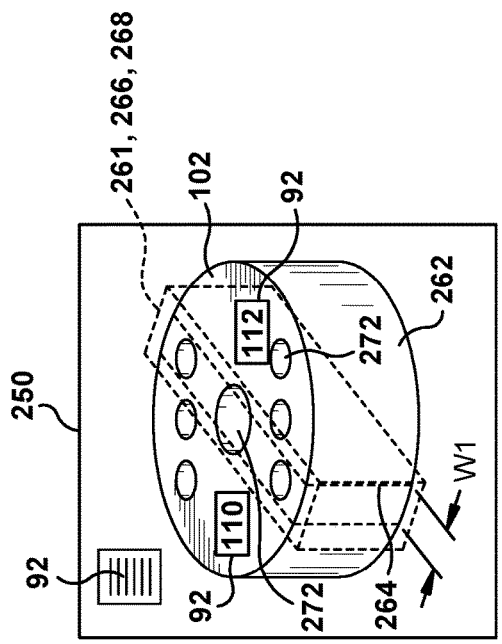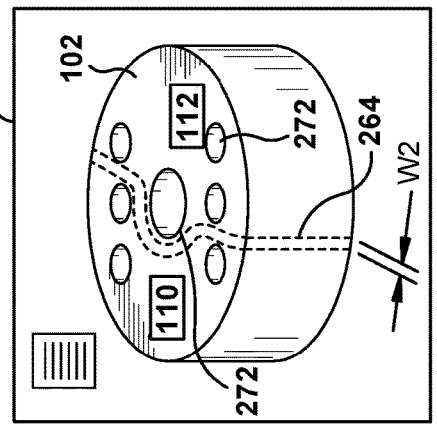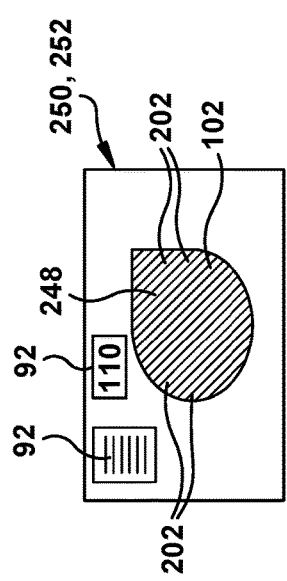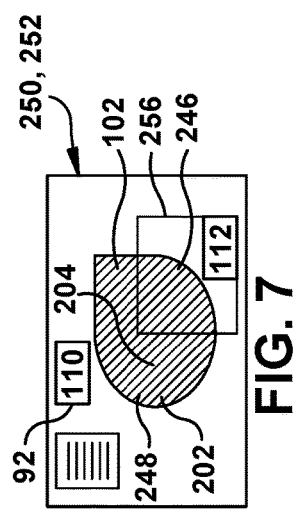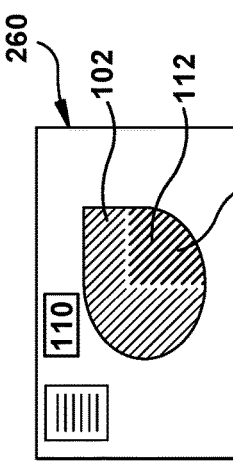

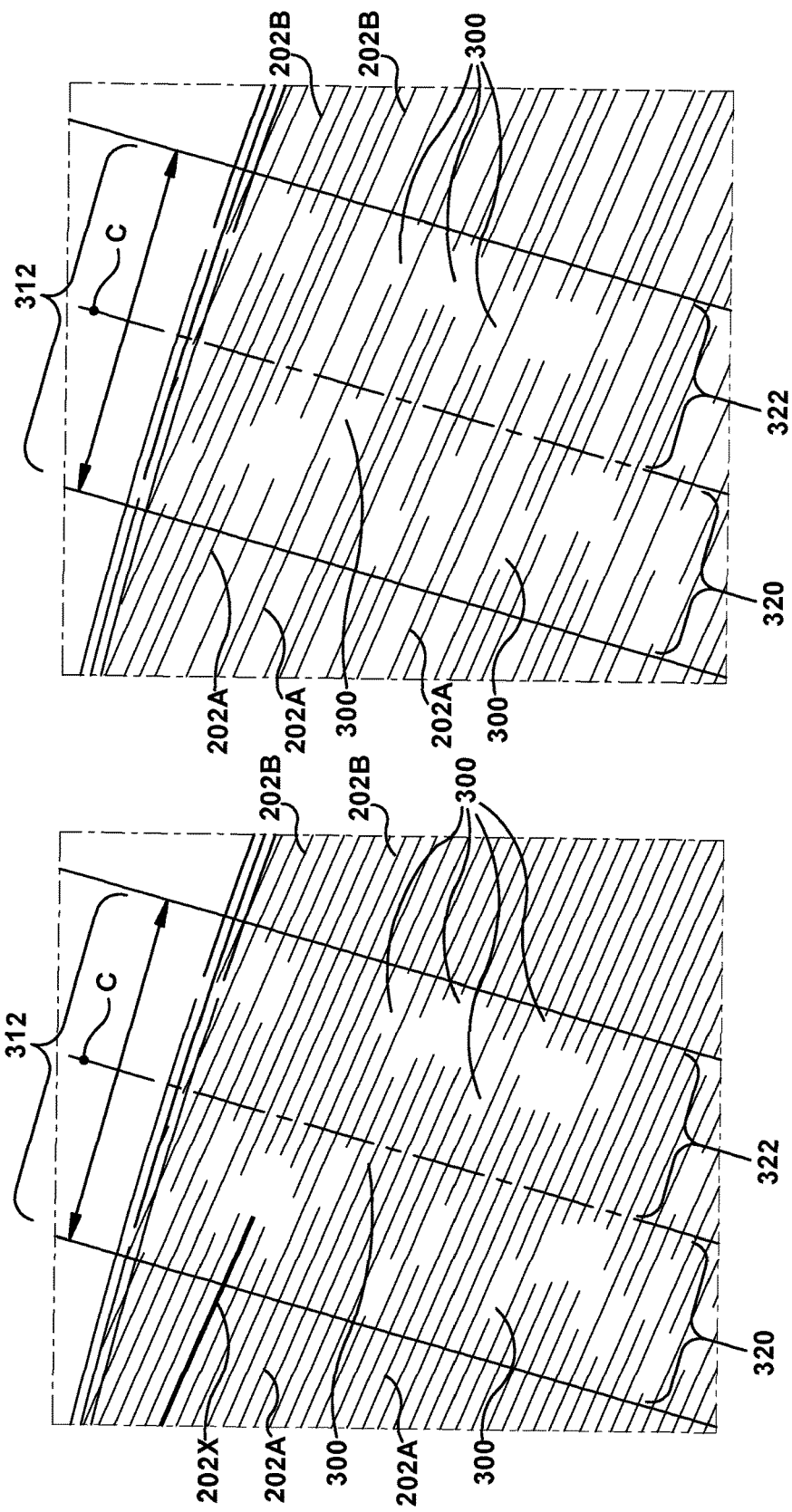

SELECTIVE MODIFICATION OF BUILD STRATEGY PARAMETER(S) FOR ADDITIVE MANUFACTURING

This application is related to co-pending U.S. patent application Ser. Nos. 15/677,417, and 15/677,426, all filed concurrently.

BACKGROUND OF THE INVENTION

The disclosure relates generally to additive manufacturing, and more particularly, to a method of selectively modifying an additive manufacturing build strategy parameter for a region of an object.

The pace of change and improvement in the realms of power generation, aviation, and other fields has accompanied extensive research for manufacturing objects used in these fields. Conventional manufacture of objects, such as metallic, plastic or ceramic composite objects, generally includes milling or cutting away regions from a slab of material before treating and modifying the cut material to yield a part, which may have been simulated using computer models, e.g., in drafting software. Manufactured objects which may be formed from metal can include, e.g., airfoil objects for installation in a turbomachine such as an aircraft engine or power generation system.

Additive manufacturing (AM) includes a wide variety of processes of producing an object through the successive layering of material rather than the removal of material. Additive manufacturing can create complex geometries without the use of any sort of tools, molds or fixtures, and with little or no waste material. Instead of machining objects from solid billets of material, much of which is cut away and discarded, the only material used in additive manufacturing is what is required to shape the object.

Additive manufacturing techniques typically include taking a three-dimensional (3D) computer aided design (CAD) object file of the object to be formed, and electronically slicing the object into layers (e.g., 18-102 micrometers thick) to create a file with a two-dimensional image of each layer (including vectors, images or coordinates) that can be used to manufacture the object. The 3D CAD object file can be created in any known fashion, e.g., computer aided design (CAD) system, a 3D scanner, or digital photography and photogrammetry software. The 3D CAD object file may undergo any necessary repair to address errors (e.g., holes, etc.) therein, and may have any CAD format such as a Standard Tessellation Language (STL) file. The 3D CAD object file may then be processed by a preparation software system (sometimes referred to as a "slicer") that interprets the 3D CAD object file and electronically slices it such that the object can be built by different types of additive manufacturing systems. The preparation software system may be part of the CAD system, part of the computerized AM system or separate from both. The preparation software system may output an object code file in any format capable of being used by the desired computerized AM system. For example, the object code file may be an STL file or an additive manufacturing file (AMF), the latter of which is an international standard that is an extensible markup-language (XML) based format designed to allow any CAD software to describe the shape and composition of any three-dimensional object to be fabricated on any AM printer. Depending on the type of additive manufacturing used, material layers are selectively dispensed, sintered, formed, deposited, etc., to create the object per the object code file.

One form of powder bed infusion (referred to herein as metal powder additive manufacturing) may include direct metal laser melting (DMLM) (also referred to as selective laser melting (SLM)). In metal powder additive manufacturing, metal powder layers are sequentially melted together to form the object. More specifically, fine metal powder layers are sequentially melted after being uniformly distributed using an applicator on a metal powder bed. Each applicator includes an applicator element in the form of a lip, brush, blade or roller made of metal, plastic, ceramic, carbon fibers or rubber that spreads the metal powder evenly over the build platform. The metal powder bed can be moved in a vertical axis. The process takes place in a processing chamber having a precisely controlled atmosphere. Once each layer is created, each two dimensional slice of the object geometry can be fused by selectively melting the metal powder. The melting may be performed by a high powered irradiation beam, such as a 100 Watt ytterbium laser, to fully weld (melt) the metal powder to form a solid metal. The irradiation beam moves in the X-Y direction, and has an intensity sufficient to fully weld (melt) the metal powder to form a solid metal. The metal powder bed may be lowered for each subsequent two dimensional layer, and the process repeats until the object is completely formed.

Some metal powder AM systems employ two or more irradiation devices, e.g., high powered lasers or electron beams, that work together to form an object. Using two or more irradiation devices may be advantageous to create larger objects faster, to allow use of larger build areas or computerized AM systems, and/or improve the accuracy of a build. Typically, for a multiple irradiation device computerized AM system, each two-dimensional image of each layer includes assignments for different irradiation devices to form different regions of the object. The irradiation device assignment can be provided by any of the AM file systems, i.e., the CAD system that creates the original layout of the object, a preparation software system, or the control system of the multiple irradiation device computerized AM system.

One challenge with current AM techniques is that build strategies that direct how an AM system will create a region of an object within each layer are not readily modifiable. For example, for a multiple irradiation device AM system, how two or more irradiation devices will create the region or interact to create the region is not easily modifiable. Build strategy parameters can take a variety of forms. One example build strategy parameter includes the location of a stitching region in an object in which two or more irradiation devices interact to build the object. Stitching regions can have an increased surface roughness or altered material properties that may not be desired to be located in sensitive areas in certain objects, e.g., within a hole that requires precise dimensions or a smooth bearing surface. Conventionally, the location of stitching regions is automatically determined by one of the aforementioned AM file systems. Consequently, prevention of a stitching region being located in a sensitive area within an object cannot be easily controlled. Any changes require labor intensive revision of the object code representative of the object. This challenge exists regardless of the category of additive manufacturing employed.

BRIEF DESCRIPTION OF THE INVENTION

A first aspect of the disclosure provides a computerized method for modifying object code representative of an object to be physically generated layer by layer by a computerized additive manufacturing (AM) system using the object code, the computerized method comprising: providing an interface to allow a user to manually: select a region within the object in the object code, the object code including a plurality of pre-assigned build strategy parameters for the object that control operation of the computerized AM system; and selectively modify a build strategy parameter in the selected region in the object code to change an operation of the computerized AM system from the plurality of pre-assigned build strategy parameters during building of the object by the computerized AM system.

A second aspect of the disclosure provides a system for modifying object code representative of an object to be physically generated layer by layer by a computerized additive manufacturing (AM) system using the object code, the system comprising: a computing device providing an interface to allow a user to manually: select a region within the object in the object code, the object code including a plurality of pre-assigned build strategy parameters for the object that control operation of the computerized AM system; and selectively modify a build strategy parameter in the selected region in the object code to change an operation of the computerized AM system from the plurality of pre-assigned build strategy parameters during building of the object by the computerized AM system.

A third aspect of the disclosure provides a computerized additive manufacturing (AM) system for physically generating an object layer by layer based on object code representative of the object, the object code including a plurality of pre-assigned build strategy parameters for the object that control operation of the computerized AM system, the computerized AM system comprising: an additive manufacturing printer; and an object code modifier providing an interface to, prior to manufacturing the object, allow a user to manually: select a region within the object in the object code; and selectively modify a build strategy parameter in the selected region in the object code to change an operation of the computerized AM system from the plurality of pre-assigned build strategy parameters during building of the object by the computerized AM system.

A fourth aspect of the disclosure includes a computer program comprising program code embodied in at least one computer-readable medium, which when executed, enables a computer system to implement a computerized method for modifying object code representative of an object to be physically generated layer by layer by a computerized additive manufacturing (AM) system using the object code, the computerized method comprising: providing an interface to allow a user to manually: select a region within the object in the object code, the object code including a plurality of pre-assigned build strategy parameters for the object that control operation of the computerized AM system; and selectively modify a build strategy parameter in the selected region in the object code to change an operation of the computerized AM system from the plurality of pre-assigned build strategy parameters during building of the object by the computerized AM system.

A fifth aspect of the disclosure provides a computerized method for modifying object code representative of an object to be physically generated layer by layer by a computerized additive manufacturing (AM) system using the object code, the computerized method comprising: providing an interface to allow a user to manually: select a region within the object in the object code, the object code including a plurality of pre-assigned build strategy parameters for the object that control operation of the computerized AM system; and selectively add a build strategy parameter in the selected region in the object code to change an operation of the computerized AM system from the plurality of pre-assigned build strategy parameters during building of the object by the computerized AM system.

The illustrative aspects of the present disclosure are designed to solve the problems herein described and/or other problems not discussed.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which:

FIG. 6 shows a schematic view of an illustrative interface for selecting a region according to embodiments of the disclosure.

FIG. 7 shows a schematic view of an illustrative interface including an example selector for selecting a region according to embodiments of the disclosure.

FIG. 8 shows a schematic view of an illustrative interface for selectively modifying a selected region according to embodiments of the disclosure.

FIG. 9 shows a schematic view of an illustrative interface including an example selector for selecting a region according to embodiments of the disclosure.

FIG. 10 shows a schematic view of an illustrative interface for selectively modifying a selected region according to embodiments of the disclosure.

FIG. 14 shows a schematic view of a layer of an object including selective modification(s) of scan vector(s) and/or scan vector end gap(s) according to further embodiments of the disclosure.

FIG. 15 shows a schematic view of a layer of an object including other selective modification(s) of scan vector(s) and/or scan vector end gap(s) according to further embodiments of the disclosure.

It is noted that the drawings of the disclosure are not to scale. The drawings are intended to depict only typical aspects of the disclosure, and therefore should not be considered as limiting the scope of the disclosure. In the drawings, like numbering represents like elements between the drawings.

DETAILED DESCRIPTION OF THE INVENTION

Figure 1:
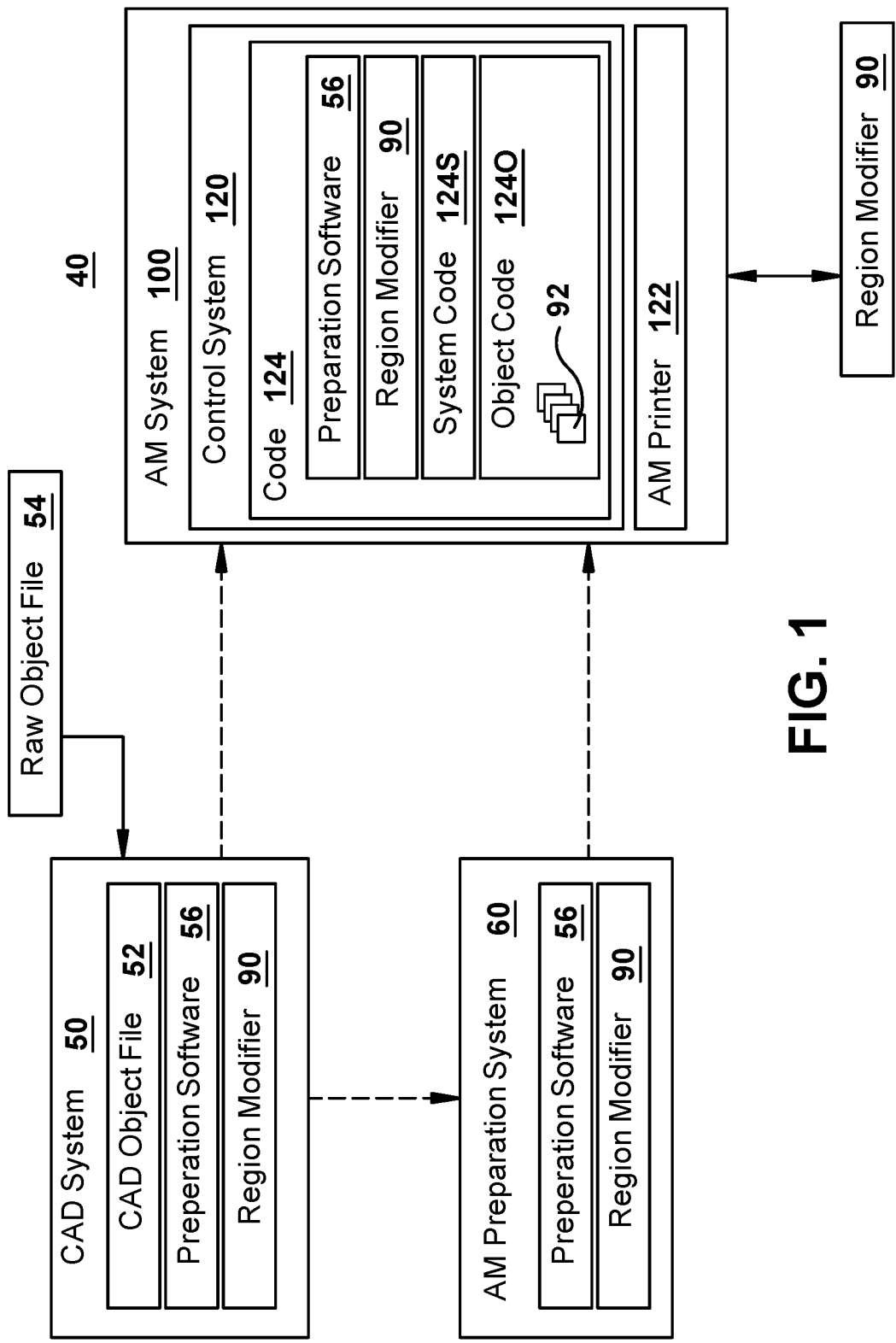
FIG. 1 shows a schematic block diagram of an illustrative additive manufacturing environment according to embodiments of the disclosure.

As indicated above, the disclosure provides various methods, systems and program products that allow for selectively modifying a build strategy parameter in a selected region in object code for an object. The object code is used by a computerized additive manufacturing (AM) system to build the object. The selective modification of the build strategy parameter changes an operation of the computerized AM system from a plurality of pre-assigned build strategy parameters during building of the object. In this fashion, individual build strategy parameters can be readily customized to address features of the object that are challenging to build. This process is manual, not automated, which allows a user to selectively modify build strategy parameters rather than relying on automated, pre-assigned build strategies. As will be described, the selectively modified build strategy parameter can include practically any aspect of how the computerized AM system will be used to build an object.

At the outset, several descriptive terms may be used regularly herein, and it should prove helpful to define these terms at the onset of this section. These terms and their definitions, unless stated otherwise, are as follows. As used herein, "build strategy" refers to a plan for a computerized AM system and how one or more printing devices thereof will be used to build an object. Each build strategy may include a number of build strategy parameters that direct how device(s) of a given additive manufacturing (AM) system will be controlled. Each "build strategy parameter" controls one or more aspect(s) of how a particular printing device operates. For purposes of description, the disclosure will be described relative to a direct metal laser melting (DMLM) AM technique using a multiple irradiation device computerized AM system. In this example, and as will be described in greater detail with regard to FIGS. 2-4, build strategy parameters may include but are not limited to: processing chamber temperature, pressure, etc.; irradiation beam width, speed, power; scan vector spacing, length and start/stop positions; irradiation device assignments; scan vector end gap spacing and positioning; and stitching region position, size and shape/path. As will be further described, the selected region upon which changes in a build strategy parameter can be applied can be user defined and can include, for example, an areal region (e.g., within each of at least one layer of the object or for particular scan vector(s), used to build the object) or a volume of the object (e.g., a number of layers). As used herein, "pre-assigned build strategy parameters" are those parameters generated as part of the conversion of a CAD or other format representation of the object into a format capable of use by an AM system to print the object; they may be automatically generated. To "modify" a build strategy parameter may include changing a pre-assigned build strategy parameter or adding a build strategy parameter.

FIG. 1 shows a schematic block diagram of an additive manufacturing (AM) environment 40 including an illustrative computerized additive manufacturing system 100 (hereinafter 'AM system 100') according to embodiments of the disclosure. As will be described herein, a region modifier 90 that implements the teachings of the disclosure can be located in a number of locations within AM environment 40. As noted, additive manufacturing techniques typically include taking a three-dimensional (3D) computer aided design (CAD) object file of the object to be formed and preparing it for use by AM system 100. CAD object file 52 can be created in any now known or later developed fashion by using, e.g., a CAD system 50 to create it, a 3D scanner (not shown) that creates a raw object file 54, or digital photography and photogrammetry software that creates raw object file 54. Raw object file 54, for example, may undergo any necessary repair to address errors (e.g., holes, etc.) therein to arrive at CAD object file 52. In any event, CAD object file 52 that provides the 3D representation of the object may be created (shown, for example, in CAD system 52) and may have any CAD format such as a Standard Tessellation Language (STL) file.

CAD object file 52 may require further preparation for use by an AM printer 122 of AM system 100. To this end, preparation software 56 for carrying out any necessary preparation of CAD object file 52 is illustrated. Preparation software 56 may be located at various locations in AM environment 40. Preparation software 56 can carry out any functions necessary to prepare CAD object file 52 into object code 124O that can be used by AM printer 122 of AM system 100. (AM system 100 generally includes an additive manufacturing control system 120 ("control system") and an AM printer 122). For example, preparation software 56 may include a "slicer" that interprets CAD object file 52 and electronically slices it to create a file (object code 124O) with a two-dimensional image of each layer (including vectors, images or coordinates) that can be used to manufacture the object. Object code 124O, as will be described, may also include a variety of additional computer executable instructions, and may undergo additional revisions using, for example, region modifier 90 according to embodiments of the disclosure. Preparation software 56 may output object code 124O in any format capable of being used by the desired AM system 100. For example, the object code may be an STL file or an AMF file.

In some cases, CAD system 50 includes preparation software 56 capable of preparing CAD object file 52 into a format that can be used by AM printer 122 of AM system 100. In one alternative, preparation software 56 may be provided by a separate additive manufacturing (AM) preparation system 60, located between CAD system 50 and AM printer 100. In another alternative, preparation software 56 is integrated into code 124 of control system 120 of AM system 100—either as part of preparation software 56 or as part of control system 120 functioning. In any event, a build strategy for the object is created that includes a plurality of pre-assigned build strategy parameters 92 for use by AM printer 122 to build the object.

As illustrated in FIG. 1, a region modifier 90 capable of carrying out the teachings of the disclosure can be located at any location at which preparation software 56 may be located. In addition, when region modifier 90 is provided as part of AM system 100, it may be implemented as part of control system 120 or at a machine code level within AM printer 122. Further, region modifier 90 may be provided as a separate entity that interacts with AM system 100 (lower right of FIG. 1).

For purposes of description, the teachings of the disclosures will be described relative to building object(s) 102 using a powder bed infusion technique in the form of DMLM, shown in FIGS. 2-4. Consequently, build strategy parameters that will be described for selective modification according to embodiments of the disclosure will be those associated with DMLM, some of which were noted previously. While the description will reference DMLM and its related build strategy parameters, it is understood that the general teachings of the disclosure are equally applicable to many other additive manufacturing techniques including but not limited to: other forms of metal powder additive manufacturing such as direct metal laser sintering (DMLS), selective laser sintering (SLS) or electron beam melting (EBM); binder jetting; polymer printing and vat photopolymerization. Each AM technique will likely have its own particular set of build strategy parameters.

Figure 2:
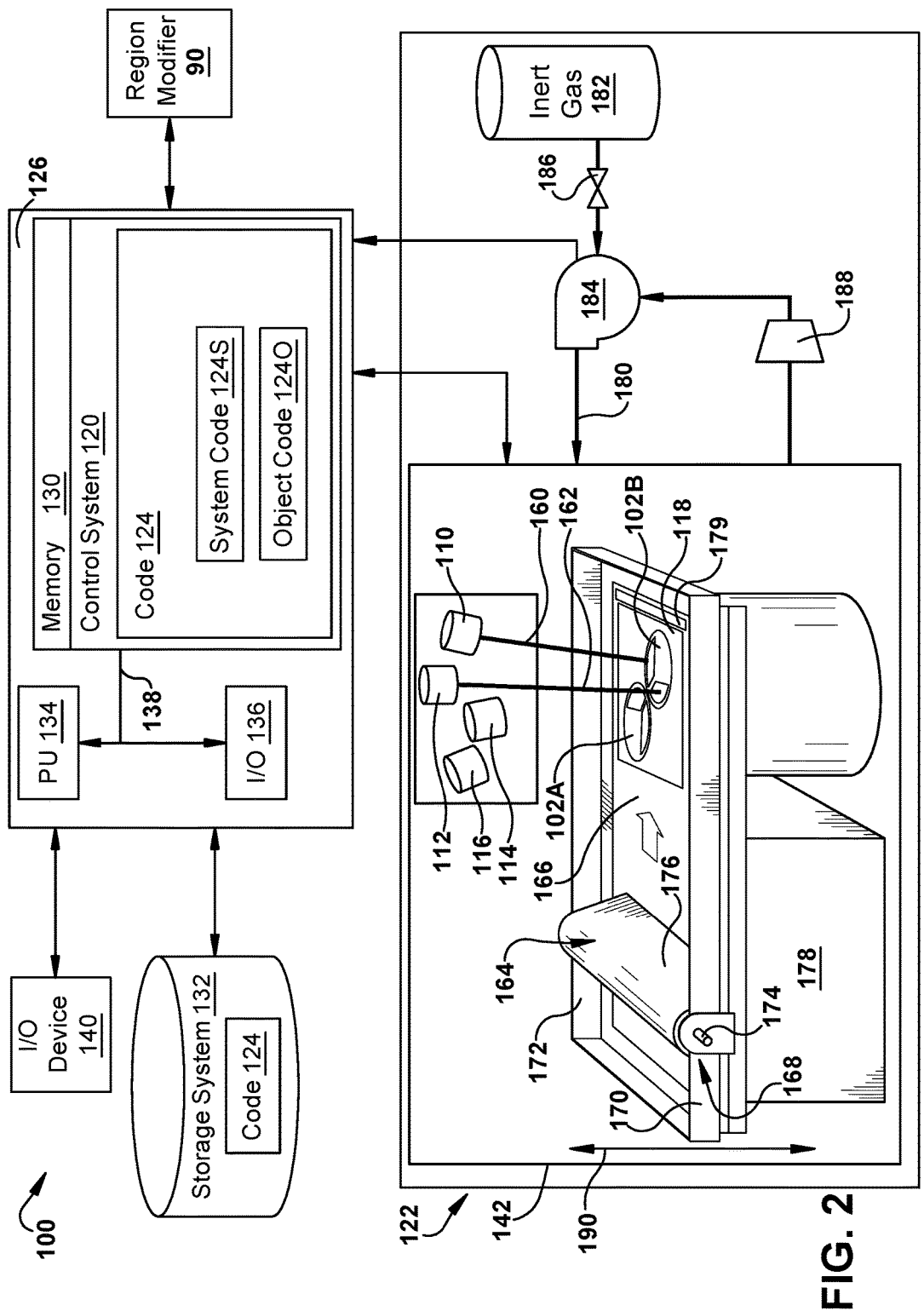
FIG. 2 shows a schematic block diagram of an illustrative additive manufacturing system and process including a non-transitory computer readable storage medium storing object code representative of an object according to embodiments of the disclosure.

FIG. 2 shows a schematic block diagram of an illustrative computerized AM system 100 for generating an object(s) 102 using DMLM. (Region modifier 90 shown as separate entity only for brevity). Object(s) 102 may include one large object or multiple objects, e.g., two objects 102A, 102B as shown, of which only a single layer is shown. The example shown uses multiple irradiation devices, e.g., four 100 Watt ytterbium lasers 110, 112, 114, 116, but it is emphasized and will be readily recognized that the teachings of the disclosure are equally applicable to an AM system 100 using any number of irradiation devices, i.e., one or more. The teachings of the disclosures are also applicable to any irradiation device, e.g., an electron beam, laser, etc., and many other techniques of additive manufacture, e.g., binder dispenser, object material dispenser, curing laser, etc. Object(s) 102 are illustrated as circular elements; however, it is understood that the additive manufacturing process can be readily adapted to manufacture any shaped object, a large variety of objects and a large number of objects on a build platform 118. Any number of object(s) 102 can be built, e.g., one or more.

As noted relative to FIG. 1, AM system 100 generally includes control system 120 and an AM printer 122. As will be described, control system 120 executes object code 124O to generate object(s) 102 using AM printer 122. A region modifier 90 according to embodiments of the disclosure is shown as an independent system interacting with control system 120, but it could be located in any location described relative to FIG. 1, e.g., as part of code 124. As a separate system, region modifier 90 can be configured to be AM system agnostic. Control system 120 is shown implemented on computing device 126 as computer program code. To this extent, computing device 126 is shown including a memory 130 and/or storage system 132, a processor unit (PU) 134, an input/output (IIO) stitching region 136, and a bus 138. Further, computing device 126 is shown in communication with an external IIO device/resource 140 and storage system 132. In general, processor unit (PU) 134 executes computer program code 124 that is stored in memory 130 and/or storage system 132. While executing computer program code 124, processor unit (PU) 134 can read and/or write data to/from memory 130, storage system 132, I/O device 140 and/or AM printer 122. Bus 138 provides a communication link between each of the objects in computing device 126, and I/O device 140 can comprise any device that enables a user to interact with computing device 126 (e.g., keyboard, pointing device, display, etc.). Computing device 126 is only representative of various possible combinations of hardware and software. For example, processor unit (PU) 134 may comprise a single processing unit, or be distributed across one or more processing units in one or more locations, e.g., on a client and server. Similarly, memory 130 and/or storage system 132 may reside at one or more physical locations. Memory 130 and/or storage system 132 can comprise any combination of various types of non-transitory computer readable storage medium including magnetic media, optical media, random access memory (RAM), read only memory (ROM), etc. Computing device 126 can comprise any type of computing device such as an industrial controller, a network server, a desktop computer, a laptop, a handheld device, etc.

It is recognized that each system in AM environment 40 in FIG. 1 (e.g., CAD system 50, AM preparation system 60, AM system 100, and separate region modifier 90) may include their own computer environment similar to that just described for AM system 100, and may communicate with other systems of AM environment 40 using any now known or later developed communication pathways. Any computing device used can comprise any general purpose computing article of manufacture capable of executing computer program code installed by a user (e.g., a personal computer, server, handheld device, etc.). In other embodiments, a computing device can comprise any specific purpose computing article of manufacture comprising hardware and/or computer program code for performing specific functions, any computing article of manufacture that comprises a combination of specific purpose and general purpose hardware/software, or the like. In each case, the program code and hardware can be created using standard programming and engineering techniques, respectively. The computing device(s) employed may take a variety of forms. For example, in one embodiment, the computing device may comprise two or more computing devices (e.g., a server cluster) that communicate over any type of wired and/or wireless communications link, such as a network, a shared memory, or the like, to perform the various process steps of the disclosure. When the communications link comprises a network, the network can comprise any combination of one or more types of networks (e.g., the Internet, a wide area network, a local area network, a virtual private network, etc.). Network adapters may also be coupled to the system to enable the data processing system to become coupled to other data processing systems or remote printers or storage devices through intervening private or public networks. Modems, cable modem and Ethernet cards are just a few of the currently available types of network adapters. Regardless, communications between the computing devices may utilize any combination of various types of transmission techniques.

Continuing with FIG. 2, as noted, AM system 100 and, in particular control system 120, executes program code 124 to generate object(s) 102. Program code 124 can include, inter alia, a set of computer-executable instructions (herein referred to as 'system code 124S') for operating AM printer 122 or other system parts, and a set of computer-executable instructions (herein referred to as 'object code 124O') defining object(s) 102 to be physically generated by AM printer 122. As described herein, additive manufacturing processes begin with a non-transitory computer readable storage medium (e.g., memory 130, storage system 132, etc.) storing program code 124. System code 124S for operating AM printer 122 may include any now known or later developed software code capable of operating AM printer 122.

Object code 124O defining object(s) 102 may include a precisely defined 3D model of an object. Object code 124O also includes a build strategy including plurality of pre-assigned build strategy parameters 92 (FIG. 1), as will be described in greater detail herein. Object code 124O can be generated from any of a large variety of well-known CAD systems 50 (FIG. 1) (such as AutoCAD®, TurboCAD®, DesignCAD 3D Max, etc.), or any AM preparation system 60 (FIG. 1). Further, certain AM systems 100 now provide control systems 120 capable of creating object code 124O, e.g., from a CAD object file 52 (FIG. 1) or a raw object file 54 (FIG. 1). In any event, object code 124O can include any now known or later developed file format. Furthermore, object code 124O representative of object(s) 102 may be translated between different formats. For example, object code 124O may include STL files or AMF files. Object code 124O representative of object(s) 102 may also be converted into a set of data signals and transmitted, received as a set of data signals and converted to code, stored, etc., as necessary. Object code 124O may also be an input to AM system 100 and may come from a part designer, an intellectual property (IP) provider, a design company, the operator or owner of AM system 100, or from other devices. In any event, control system 120 executes system code 124S and object code 124O, dividing object(s) 102 into a series of thin slices that assemble using AM printer 122 in successive layers of material. Region modifier 90 may modify object code 124O per embodiments of the disclosure prior to manufacture by AM printer 122.

AM printer 122 may include a processing chamber 142 that is sealed to provide a controlled atmosphere for object(s) 102 printing, e.g., a set pressure and temperature for lasers, a vacuum for electron beam melting, or another atmosphere for other forms of additive manufacture. A build platform 118, upon which object(s) 102 is/are built, is positioned within processing chamber 142. For the metal powder AM process example used herein, a number of irradiation devices 110, 112, 114, 116 are configured to melt layers of metal powder on build platform 118 to generate object(s) 102. While four irradiation devices 110, 112, 114, 116 will be described herein, it is emphasized that the teachings of the disclosure are applicable to a system employing any number of devices, e.g., 1, 2, 3, or 5 or more.

Build strategy parameters for DMLM may include but are not limited to: irradiation beam width, speed, power; scan vector spacing, length and start/stop positions; and where more than one irradiation device is employed: irradiation device assignments, scan vector end gap (melt pool) spacing and positioning, and stitching region position, size and shape/path. To further explain, FIG. 3 and FIG. 4 show two examples of scan vectors and fields for a multiple irradiation device AM system. FIG. 3 shows a schematic perspective view of irradiation devices of AM system 100 using two irradiation devices 110, 112, e.g., lasers. During operation, the irradiation device(s) (dashed lines) are guided, e.g., by scanner mirrors for lasers or electromagnetic field/electric coils for electron beams, along scan vectors (paths), which are indicated by arrows on a top surface of illustrative object 102. Internal scan vectors 202 melt inner regions 204 of object 120 that scan linearly across a layer, and a very thin border 206 is melted with one to three contour scan vectors 208 that only follow a desired outer edge of the layer. Build strategy parameters for the two irradiation device AM system used here can include, for example, irradiation beam width, speed, power, and scan vector 202, 208 spacing, length and start/stop positions. (Beam width controls a width of the irradiation beam side-to-side.) These build strategy parameters are also applicable to single irradiation device AM systems. In FIG. 3, each laser 110, 112 has its own field (1 and 2, respectively) upon which it can work. Each irradiation device 110, 112 may work within only a small portion of its respective field at any given time. Each field and the scan vectors are assigned to one or the other device 110, 112 with an interface 210 (within oval) where fields 1, 2 of pair of devices 110, 112 meet. Thus, build strategy parameters can further include, for example, irradiation device assignments. Where each scan vector 202 goes, a melt pool is created, and where each scan vector 202 stops, its melt pool stops. Thus, where two scan vectors, e.g., 202A, 202B, stop adjacent one another, a scan vector end gap 229 exists in which it is expected the melt pools will merge to create a solid object from the metal powder. Scan vector 202, 208 (hereinafter collectively referred to as "scan vector(s) 202") spacing and positioning can also constitute build strategy parameters. Further, as noted, an irradiation device assignment indicating which scan vector is made by which irradiation device is a build strategy parameter. Each irradiation device 110, 112 is calibrated in any now known or later developed manner. Each irradiation device 110, 112 has had its laser or electron beam's anticipated position relative to build platform 118 correlated with its actual position in order to provide an individual position correction (not shown) to ensure its individual accuracy. Interface 210 in body 222 of object 120 defines a first portion 224 and a second portion 226 of body 222 made by different irradiation devices 110, 112 of multiple irradiation device AM system 100 during a single build. Here, fields 1, 2 meet at a line, creating a planar interface 228 in object 102.

Figure 3:
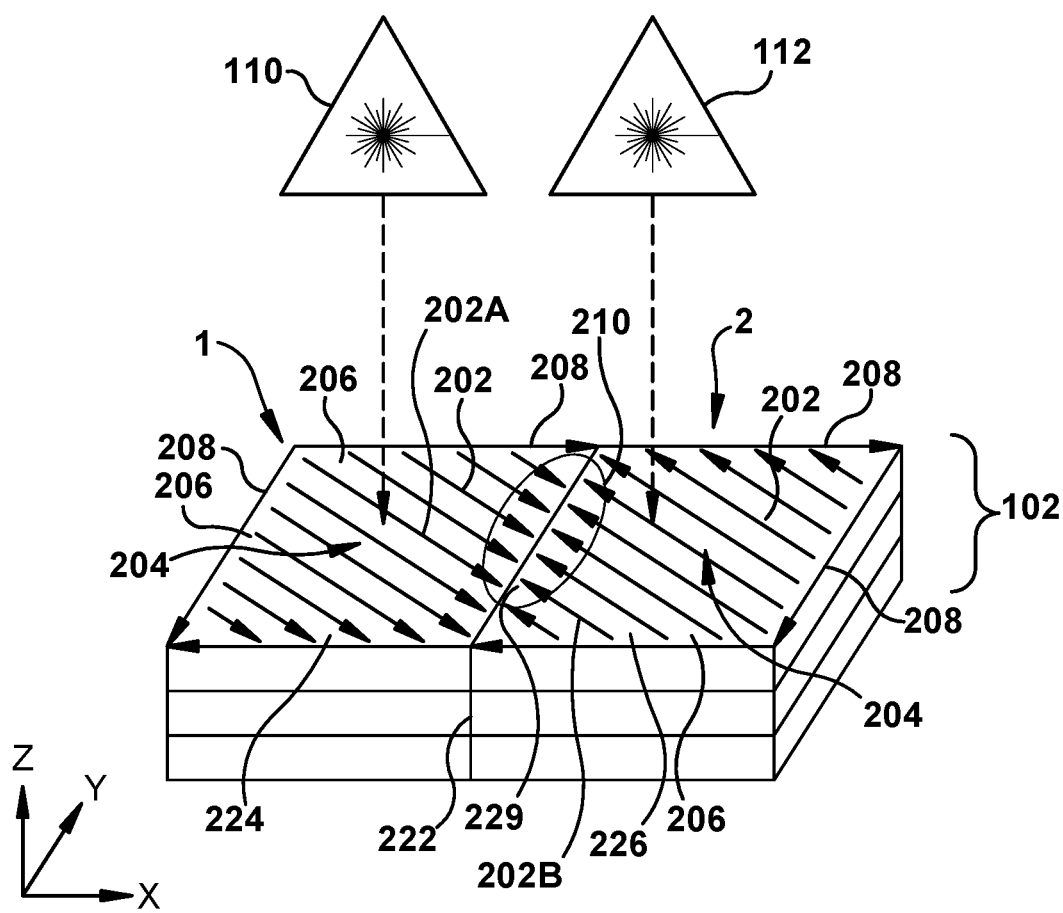
FIG. 3 shows a schematic perspective view of a two irradiation device additive manufacturing system building an object.
Figure 4:
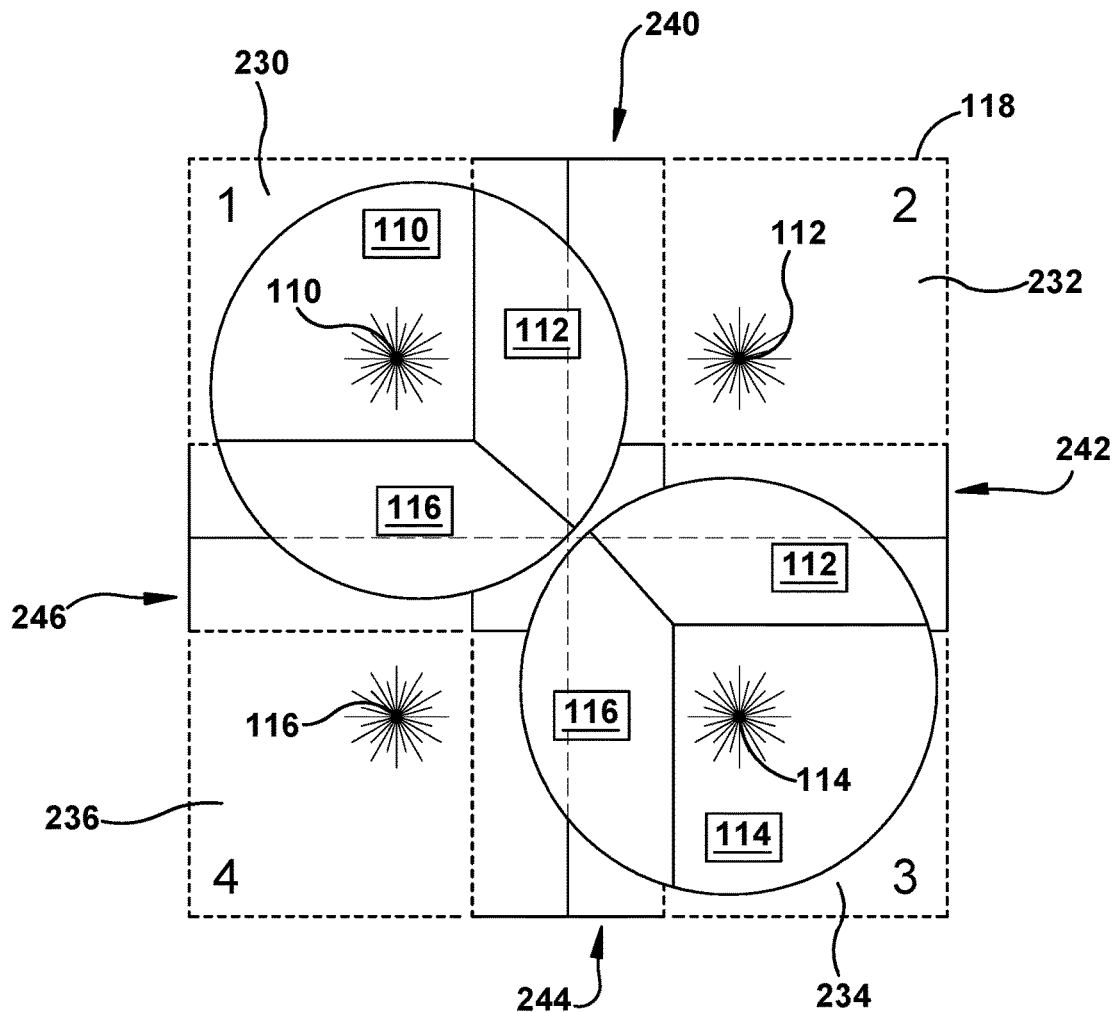
FIG. 4 shows a schematic plan view of respective fields of a four irradiation device additive manufacturing system.

FIG. 4 shows a schematic plan view of irradiation devices of an AM system using four irradiation devices 110, 112, 114, 116, e.g., lasers, in which stitching regions are created. Here, each irradiation device 110, 112, 114, 116 has a field 1, 2, 3 or 4 including a non-overlapping field region 230, 232, 234, 236, respectively, in which it can exclusively melt metal powder, and at least one overlapping field region or stitching region 240, 242, 244, 246 in which two or more devices can melt metal powder. (Herein, boxed numbers of devices 110, 112, 114, 116 indicate which device creates the shape illustrated thereabout). In this regard, each irradiation device 110, 112, 114, 116 may generate an irradiation device beam (two shown, 160, 162, in FIG. 2), respectively, that fuses particles for each slice, as defined by object code 124O. For example, in FIG. 2, irradiation device 110 is shown creating a layer of object 102B using irradiation device 160 in one region, while irradiation device 112 is shown creating a layer of object 102B using irradiation device 162 in another region. In addition to those build strategy parameters described relative to FIG. 3, stitching region position, size and shape/path may also constitute build strategy parameters. Again, each irradiation device 110, 112, 114, 116 is calibrated in any now known or later developed manner. That is, each irradiation device 110, 112, 114, 116 has had its laser or electron beam's anticipated position relative to build platform 118 correlated with its actual position in order to provide an individual position correction (not shown) to ensure its individual accuracy. In one embodiment, each of plurality irradiation devices 110, 112, 114, 116 may create an irradiation device beam, e.g., 160, 162 (FIG. 2), having the same cross-sectional dimensions (e.g., shape and size in operation), power and scan speed; however, such build strategy parameters can be selectively modified according to embodiments of the disclosure. It is recognized that while four devices 110, 112, 114, 116 have been illustrated to describe a stitching region for overlapping fields, any two devices may create overlapping fields.

Returning to FIG. 2, an applicator 164 may create a thin layer of raw material 166 spread out as the blank canvas from which each successive slice of the final object will be created. Applicator 164 may move under control of a linear transport system 168. Linear transport system 168 may include any now known or later developed arrangement for moving applicator 164. In one embodiment, linear transport system 168 may include a pair of opposing rails 170, 172 extending on opposing sides of build platform 118, and a linear actuator 174 such as an electric motor coupled to applicator 164 for moving it along rails 170, 172. Linear actuator 174 is controlled by control system 120 to move applicator 164. Other forms of linear transport systems may also be employed. Applicator 164 can take a variety of forms. In one embodiment, applicator 164 may include a body 176 configured to move along opposing rails 170, 172, and an actuator element (not shown in FIG. 2) in the form of a tip, blade or brush configured to spread metal powder evenly over build platform 118, i.e., build platform 118 or a previously formed layer of object(s) 102, to create a layer of raw material. The actuator element may be coupled to body 176 using a holder (not shown) in any number of ways. The process may use different raw materials in the form of metal powder. Raw materials may be provided to applicator 164 in a number of ways. In one embodiment, shown in FIG. 2, a stock of raw material may be held in a raw material device 178 in the form of a chamber accessible by applicator 164. In other arrangements, raw material may be delivered through applicator 164, e.g., through body 176 in front of its applicator element and over build platform 118. In any event, an overflow chamber 179 may be provided on a far side of applicator 164 to capture any overflow of raw material not layered on build platform 118. In FIG. 2, only one applicator 164 is shown. In some embodiments, applicator 164 may be among a plurality of applicators in which applicator 164 is an active applicator and other replacement applicators (not shown) are stored for use with linear transport system 168. Used applicators (not shown) may also be stored after they are no longer usable.

In one embodiment, object(s) 102 may be made of a metal which may include a pure metal or an alloy. In one example, the metal may include practically any non-reactive metal powder, i.e., non-explosive or non-conductive powder, such as but not limited to: a cobalt chromium molybdenum (CoCrMo) alloy, stainless steel, an austenite nickel-chromium based alloy such as a nickel-chromium-molybdenum-niobium alloy (NiCrMoNb) (e.g., Inconel 625 or Inconel 718), a nickel-chromium-iron-molybdenum alloy (NiCrFeMo) (e.g., Hastelloy® X available from Haynes International, Inc.), or a nickel-chromium-cobalt-molybdenum alloy (NiCrCoMo) (e.g., Haynes 282 available from Haynes International, Inc.), etc. In another example, the metal may include practically any metal such as but not limited to: tool steel (e.g., H13), titanium alloy (e.g., $Ti_6Al_4V$), stainless steel (e.g., 316L) cobalt-chrome alloy (e.g., CoCrMo), and aluminum alloy (e.g., $AlSi_{10}Mg$). In another example, the metal may include practically any reactive metal such as but not limited to those known under their brand names: IN738LC, Rene 108, FSX 414, X-40, X-45, MAR-M509, MAR-M302 or Merl 72/Polymet 972.

The atmosphere within processing chamber 142 is controlled for the particular type of irradiation device being used. For example, for lasers, processing chamber 142 may be filled with an inert gas such as argon or nitrogen and controlled to minimize or eliminate oxygen. Here, control system 120 is configured to control a flow of an inert gas mixture 180 within processing chamber 142 from a source of inert gas 182. In this case, control system 120 may control a pump 184, and/or a flow valve system 186 for inert gas to control the content of gas mixture 180. Flow valve system 186 may include one or more computer controllable valves, flow sensors, temperature sensors, pressure sensors, etc., capable of precisely controlling flow of the particular gas. Pump 184 may be provided with or without valve system 186. Where pump 184 is omitted, inert gas may simply enter a conduit or manifold prior to introduction to processing chamber 142. Source of inert gas 182 may take the form of any conventional source for the material contained therein, e.g. a tank, reservoir or other source. Any sensors (not shown) required to measure gas mixture 180 may be provided. Gas mixture 180 may be filtered using a filter 188 in a conventional manner. Alternatively, for electron beams, processing chamber 142 may be controlled to maintain a vacuum. Here, control system 120 may control a pump 184 to maintain the vacuum, and flow valve system 186, source of inert gas 182 and/or filter 188 may be omitted. Any sensors (not shown) necessary to maintain the vacuum may be employed. Other appropriate atmospheres may be provided for other AM techniques, e.g., 3D printing.

A vertical adjustment system 190 may be provided to vertically adjust a position of various parts of AM printer 122 to accommodate the addition of each new layer, e.g., a build platform 118 may lower and/or chamber 142 and/or applicator 164 may rise after each layer. An extent to which vertical adjustment system 190 moves may also be a build strategy parameter. Vertical adjustment system 190 may include any now known or later developed linear actuators to provide such adjustment that are under the control of control system 120.

In operation, build platform 118 with metal powder thereon is provided within processing chamber 142, and control system 120 controls the atmosphere within processing chamber 142. Any aspect of atmospheric control within processing chamber 142 may also constitute a build strategy parameter. Control system 120 also controls AM printer 122, and in particular, applicator 164 (e.g., linear actuator 174) and irradiation device(s) 110, 112, 114, 116 to sequentially melt layers of metal powder on build platform 118 to generate object(s) 102 according to object code 124O. As noted, various parts of AM printer 122 may vertically move via vertical adjustment system 190 to accommodate the addition of each new layer, e.g., a build platform 118 may lower and/or chamber 142 and/or applicator 164 may rise after each layer.

While FIGS. 2-4 have been described herein to provide an understanding of build strategy parameters, e.g., relative to the DMLM additive manufacturing technique. It is emphasized that other additive manufacturing techniques may employ different build strategy parameters. For example, in binder jetting, a binder liquid flow rate may constitute a build strategy parameter, or in 3D polymer printing, a temperature of polymer may constitute a build strategy parameter.

With reference to FIGS. 2-4, the flow diagram of FIG. 5, and non-limiting examples shown in FIGS. 6-14, a computerized method for modifying object code 124O representative of object 102 to be physically generated layer by layer by computerized AM system 100 using the object code, will now be described. At the outset, object code 124O includes plurality of pre-assigned build strategy parameters 92 for object 102 that control operation of computerized AM system 100. That is, object code 124O has undergone some level of preparation for additive manufacture in which a build strategy therefore has been created. For example, irradiation device assignments are made, irradiation device beam width, speed and power are assigned, and scan vector spacing, and start/stops are known. Typically, this process occurs with AM system 100 through use of some form of AM preparation system. This process may also include any now known or later developed computerized slicing technique of object 102 into layers for additive manufacture. That is, object code 124O may include a layer by layer representation of object 102, each layer to be sequentially, physically generated by AM system 100.

Figure 5:
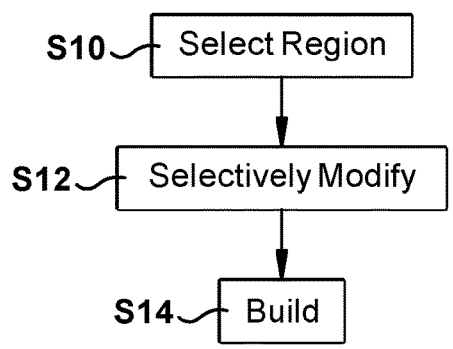
FIG. 5 shows a flow diagram of a computerized method according to embodiments of the disclosure.

In a first process S10 in FIG. 5, region modifier 90 provides an interface 250 (FIGS. 6-7) to allow a user to manually select a region 246 (FIG. 7) within object 102 in object code 124O. The providing of interface 250 by region modifier 90, as noted herein, may occur at any of a number of locations such as but not limited to: at AM system 100 (FIGS. 1-2); at CAD system 50 (FIG. 1); or at AM preparation system 60 apart from AM system 100. Interface 250 (FIGS. 6-7) may be provided in any manner I/O device 140 (FIG. 2) can accommodate. Further, region 246 may be selected using any now known or later developed manner of inputting a two-dimensional or three-dimensional geographic selection into a computing device, e.g., via I/O device 140 for computing device 126 (FIG. 2). FIGS. 6 and 7 show one embodiment of a two-dimensional selection of region 246, and FIG. 9 shows one embodiment of a three-dimensional selection of region 266.

In FIGS. 6 and 7, a portion of object 102, e.g., a layer 248 (slice) or a portion thereof, can be illustrated in an interface 250. Here, region modifier 90 may provide interface 250 in the form of a graphical user interface (GUI) 252 showing layer 248 of object 102 to a user to allow the user to select region 246 as a two-dimensional area of layer 248 in which build strategy parameters will be selectively modified. As shown in FIG. 6, where possible, GUI 252 may illustrate pre-assigned build strategy parameters 92 in any now known or later developed fashion, e.g., color, textual indicators, dimensional indicators, mapping marks, tables, dropdown menus, etc. For example, in FIG. 6, irradiation device 110 assignment for all of layer 248 is noted textually (boxed number), and a scan vector spacing (i.e., space between adjacent scan vectors) may be indicated with color, e.g., blue, or cross-hatching. Although not shown, GUI 252 may include a large variety of textual indications of practically any desired additional pre-assigned build strategy parameters 92, e.g., via an interactive table or listing. In the GUI embodiment, region 246 can be selected using any now known or later developed manner in which a portion of an image can be selected in GUI 252. In the example shown in FIG. 7, a square cropping box 256 is employed; however, any other size or shape selector may be employed. Further, a freehand cropping tool may be employed for more precision. In another embodiment, one or more ranges of coordinates may be numerically input to select region 246. While region 246 has been shown as a square two-dimensional area in FIG. 7, region 246 can take on practically any form including but not limited to: a line, a dot or particular scan vector(s) 202. While a singular region 246 has been described as selected, it is emphasized that process S10 can be repeated as many times as modifications are desired, e.g., for a number of layers of object 102, for a number of regions within a layer, for a number of scan vectors within a layer, etc. Where more than one region 246 is selected in more than one layer, collectively, the selected region may extend vertically within object 102, e.g., where the same region of a number of adjacent layers is selected.

In process S12 in FIG. 5, region modifier 90 provides interface 260 (FIG. 8) to allow a user to manually selectively modify a pre-assigned build strategy parameter in selected region 246 in object code 124O to change an operation of computerized AM system 100 from plurality of pre-assigned build strategy parameters 92 during building of the object by the computerized AM system. Interface 260 may be the same as that provided to select region 246, or may be a different interface entirely, e.g., a textual input, a table input. The modification can be of any build strategy parameter applicable to region 246. In one example shown, plurality of pre-assigned build strategy parameters 92 may include at least one pre-assigned irradiation device assignment for each layer of object 102 (e.g., 110 for layer 248 in FIG. 6), and the selective modification may include changing the at least one pre-assigned irradiation device assignment within region 246. In the example shown in FIG. 8, some of internal scan vectors 202 of region 246 (FIG. 7) may be re-assigned to be built by irradiation device 112 (boxed number), rather than irradiation device 110. The modification can be made in any now known or later developed fashion of changing parameters in a GUI, e.g., by input into an entry of a table of pre-assigned build strategy parameters 92, by selecting a different indicator from a dropdown menu, by drag and drop techniques, etc.

Referring to FIGS. 9 and 10, an embodiment for selecting a three-dimensional region 261 of object 102 is illustrated. Here, region modifier 90 may provide GUI 250 (FIG. 9) showing a volume 262 (total or portion) of object 102 to a user to allow the user to select region 266 as a three-dimensional area of volume 262 in which pre-assigned build strategy parameters 92 will be selectively modified. As shown in FIG. 9, where possible, GUI 250 may illustrate pre-assigned build strategy parameters 92 in any now known or later developed fashion, e.g., color, textual indicators, dimensional indicators, mapping marks, tables, dropdown menus, etc. For example, in FIG. 9, irradiation device 110 assignment for the left half of volume 262 and irradiation device 112 assignment for the right half of volume 262 are noted textually (boxed numbers), and a stitching region 264 is illustrated with a dashed cube or lines. GUI 252 may include a large variety of textual indications of practically any desired additional pre-assigned build strategy parameters 92, e.g., via an interactive table or listing. In the GUI embodiment, region 261 can be selected using any now known or later developed manner in which a three-dimensional portion of an image can be selected in GUI 252. In the example shown in FIG. 9, an elongated cropping cube 268 is employed; however, any other size or shape cropping selector may be employed. Further, a freehand cropping tool may be employed for more precision. In another embodiment, one or more ranges of coordinates may be numerically input to define region 261. While region 261 has been shown as an elongated cubical three-dimensional volume in FIG. 9, region 261 can take on practically any three-dimensional form including preset three-dimensional forms, e.g., a sphere, or a particular portion of object 102, e.g., a shroud of an airfoil.

In process S12 in FIG. 5, region modifier 90 provides interface 270 (FIG. 10) to allow a user to manually selectively modify a build strategy parameter in selected region 261 (FIG. 9) in object code 124O to change an operation of computerized AM system 100 from plurality of pre-assigned build strategy parameters 92 during building of the object by the computerized AM system. The providing of interface 270 by region modifier 90, as noted herein, may occur at any of a number of locations such as but not limited to: at AM system 100 (FIGS. 1-2); at CAD system 50 (FIG. 1); or at AM preparation system 60 apart from AM system 100. Interface 270 may be the same as that provided to select region 261, or may be a different interface entirely, e.g., a textual input, a table input. In the example shown in FIG. 10, a size and/or shape of stitching region 264 is modified to avoid opening(s) 272 in object 102. The modification can be made in any now known or later developed fashion of changing parameters in a GUI, e.g., by input into an entry of a table of pre-assigned build strategy parameters 92, by selecting a different indicator from a dropdown menu, by drag and drop techniques, by selecting and modifying visually renderable build strategy parameters (e.g., stitching region position), etc.

While singular regions 246, 261 have been described as selected, it is emphasized that process S10 can be repeated as many times as modifications are desired, e.g., for a number of regions of object 102. For example, selected region 246 (FIG. 7) may include a plurality of regions, and the layer to which it is addressed may include a plurality of layers, and each region may include a selectively modified build strategy parameter.

In process S14 in FIG. 5, object code 124O is used to build object 102 with the selectively modified build strategy parameter using computerized AM system 100. The build may proceed in any now known or later developed fashion appropriate for the type of additive manufacturing employed, but using the build strategy parameter(s) as selectively modified according to embodiments of the disclosure.

Referring to FIGS. 11-14, embodiments of some illustrative pre-assigned build strategy parameters 92 for multiple irradiation device AM systems and related build strategy modifications will now be described. As noted herein, AM system 100 may include at least two irradiation devices 110, 112, 114, 116 (FIG. 2). Where two irradiation devices are employed, the selected region (246 in FIG. 7 or 261 in FIG. 9) may include a stitching region 264 (FIG. 9) to be created by the at least two irradiation devices, e.g., 110, 112 in FIG. 9. Here, build strategy parameter(s) control operation of the irradiation devices of the computerized AM system relative to the stitching region.

Figure 11:
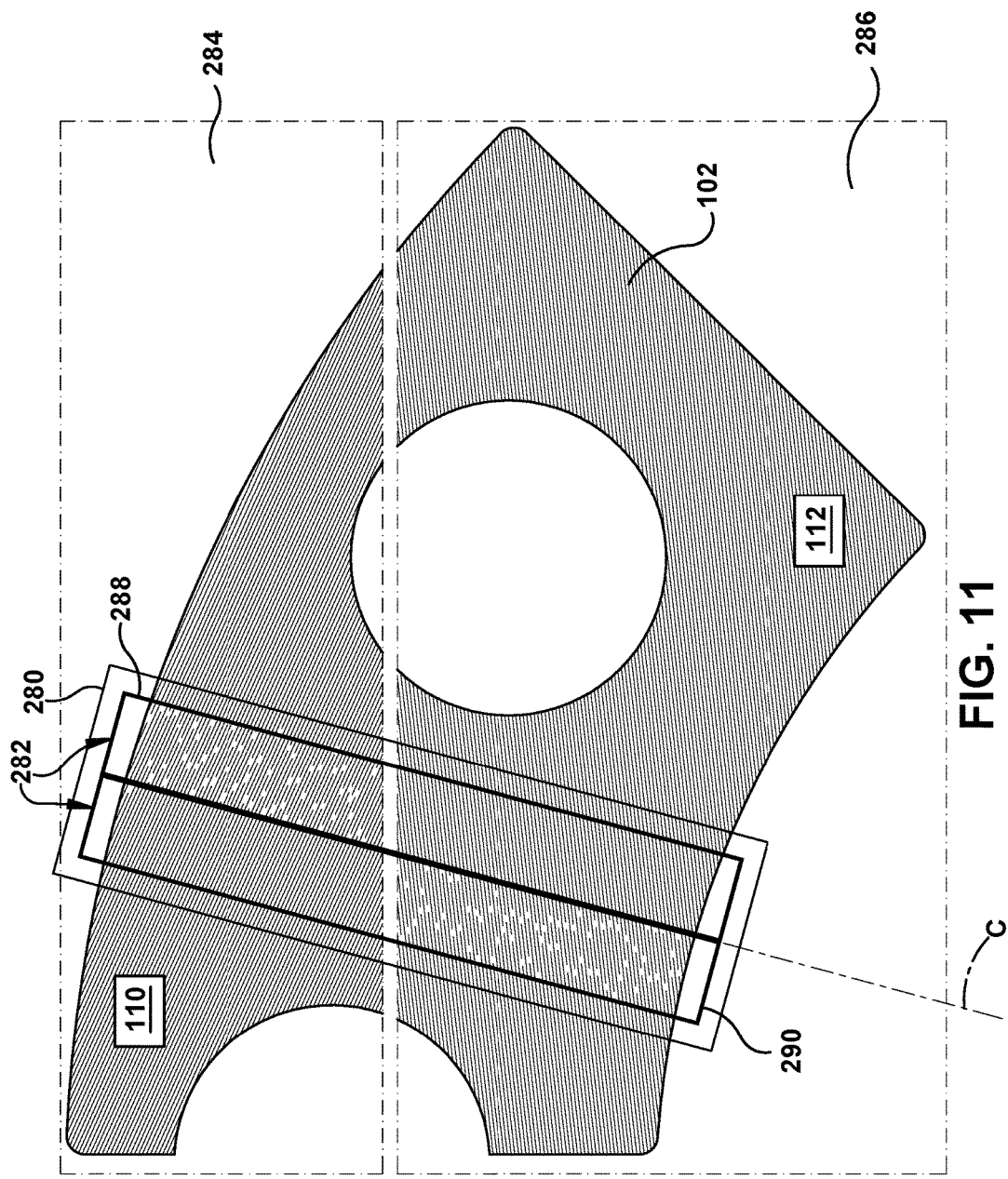
FIG. 11 shows a schematic view of layers of an object including selective modification(s) of a stitching region according to embodiments of the disclosure.

Referring to FIG. 11, a portion of a first layer 284 of object 102 is shown superimposed next to a portion of a second, adjacent layer 286 of object 102 to illustrate an example selective modification relative to a stitching region 282. Here, a selected region 280 encompassing stitching region 282 may extend vertically across a plurality of layers of the object (e.g., like region 261 in FIG. 9). Selected region 280 includes stitching region 282 in which two irradiation devices 110, 112 each may create object 102. First layer 284 may represent, for example, odd numbered layers, and second layer 286 may represent even numbered layers (or vice versa) of object 102.

With reference to FIG. 11 along with FIGS. 9 and 10, various embodiments of the disclosure include selectively modifying a position of stitching region 282 in selected region 280 of one or more layers 284, 286 of object 102 from plurality of pre-assigned build strategy parameters 92 (FIG. 2). For example, conventional pre-assigned build strategy parameters 92 (FIG. 2) typically indicate a stitching region should be built vertically upon itself in each layer of object 102, like stitching region 264 in FIG. 9. The assignment of the position of a stitching region per conventional pre-assigned build strategy parameters 92 (FIG. 2) does not consider avoiding object 102 features in which stitching region existence is not ideal, e.g., openings 272 in FIG. 9. In one embodiment, shown in FIG. 11, the selective modification according to one embodiment of the disclosure may include assigning a first position 288 for stitching region 282 in first layer 284 of object 102, and assigning a second, different position 290 for stitching region 282 in a second, different layer 286 of object 102. In this manner, stitching region position switches in each layer and issues arising from stitching region 282 being built upon itself in the same area in each layer can be avoided. For example, while not necessary in all instances, in FIG. 11, first position 288 of stitching region 282 in first layer 284 does not overlap with second, different position 290 of stitching region 282 in second, different layer 286. Here, first position 288 may be on a first lateral side of a centerline C of selected region 280, and second, different position 290 may be on a second, different lateral side of centerline C of selected region 280. In this manner, stitching region 282 position shifts from first position 288 to second, different position 290 as object 102 is built, creating a less rough surface at an outer surface of object 102 and perhaps creating a stronger object 102 due to the geographic distribution of stitching region 282.

In another embodiment, the build strategy parameter selective modifying may include modifying a size of stitching region 264 in selected region 261 of layer(s) of object 102 from the plurality of pre-assigned build strategy parameters 92 (FIG. 2). This selective modification can be observed by comparing stitching region 264 in FIG. 9, having a width W1, to stitching region 264 in FIG. 10 after modification having a different width W2 (smaller in example shown). FIG. 10 also shows another embodiment including modifying a shape (or path) of stitching region 264 in selected region 261 of layer(s) of object 102 from the plurality of pre-assigned build strategy parameters 92 (FIG. 2). In FIG. 10, stitching region 264 curves around openings 272 in object 102, compared to extending linearly through openings 272 in FIG. 9. FIG. 10 also shows another, simpler embodiment of modifying a position of stitching region 264 in selected region 266 of layer(s) of object 102 from plurality of pre-assigned build strategy parameters 92 (FIG. 2) compared to FIG. 11. That is, in FIG. 10, stitching region 264 is moved laterally in some spots to avoid openings 272 in object 102, compared to extending through openings 272 in FIG. 9. The modifications shown can be made, for example, by drag and drop techniques, or textual inputs.

Figure 12:
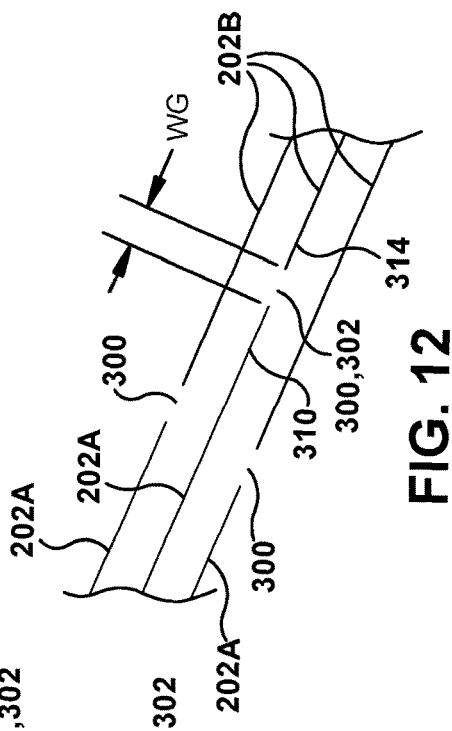
FIG. 12 shows an enlarged schematic view of a layer of an object including selective modification(s) of scan vector(s) and/or scan vector end gap(s) according to embodiments of the disclosure.
Figure 13:
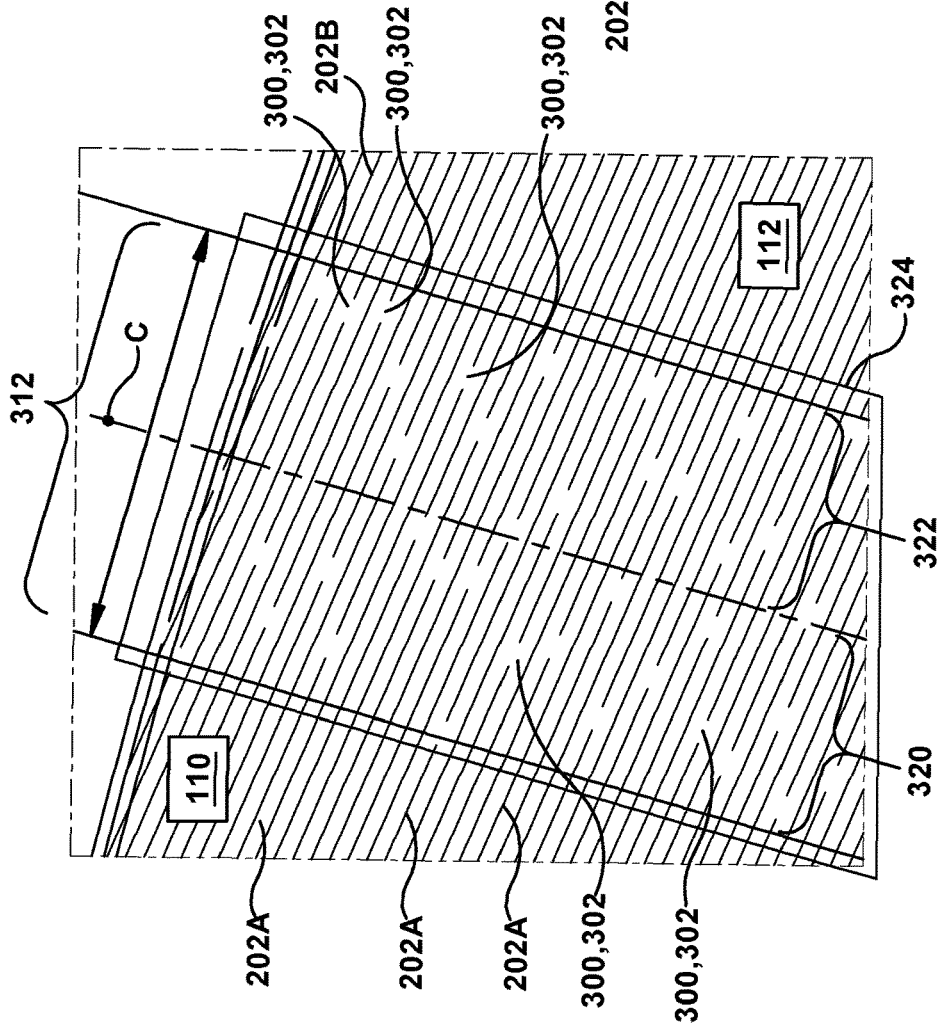
FIG. 13 shows a schematic view of a selected region of a single layer (of many) of an object including selective modification(s) of scan vector(s) and/or scan vector end gap(s) according to other embodiments of the disclosure.

Referring to FIGS. 12 and 13, in another embodiment, build strategy parameter modifying may include modifying a characteristic of one or more scan vector end gaps 302 among a plurality of spaced scan vector end gaps 300 created by at least two irradiation devices, e.g., 110, 112 (FIG. 2). More particularly, FIGS. 12 and 13 show scan vectors 202A, 202B each formed by at least two irradiation devices, e.g., scan vectors 202A formed by one irradiation device (e.g., 110 in FIG. 2), and scan vectors 202B formed by another irradiation device (e.g., 112 in FIG. 2). As shown best in FIG. 12, scan vectors 202A, 202B define a scan vector end gap 300 in a spaced between melt pool ends 310, 314 of the scan vectors. That is, each scan vector end gap 300 is defined between a first melt pool end 310 of a first irradiation device (e.g., 110 for scan vectors 202A) in stitching region 312 (FIG. 13) and a second, abutting melt pool end 314 of a second, different irradiation device (e.g., 112 for scan vectors 202B) in stitching region 312 (FIG. 13). Each scan vector end gap 300 may have a width $W_G$. As noted, conventional pre-assigned build strategy parameters 92 (FIG. 2) typically indicate a stitching region should be built vertically upon itself in each layer of object 102, like stitching region 264 in FIG. 9. In this case, scan vector end gaps 300 typically are aligned vertically within a stitching region, creating a planar area in object 102 in which the gaps are stacked upon one another. In accordance with another embodiment of the disclosure, scan vector end gaps 300 may be selectively modified by changing their size, e.g., by increasing or decreasing any one or more of them in width. That is, the build strategy parameter modifying may include modifying a size ($W_G$) of at least one of the plurality of spaced, scan vector end gaps 300. In this fashion, where it is advantageous, for example, to have scan vector end gaps closer together or farther apart, e.g., to strengthen an area or to avoid some object feature, the change can be selectively made. As will be understood, changing positions of scan vector end gaps also changes the length of certain scan vectors 202. The modification can be made, for example, by drag and drop techniques, or textual inputs.

In another embodiment shown in FIG. 13, stitching region 312 may have a centerline C defining a first half 320 and a second half 322 thereof in selected region 324. Here, build strategy parameter modifying may include alternatingly positioning the plurality of spaced, scan vector end gaps 300 in first half 320 and second half 322 of stitching region 324. That is, each scan vector end gap 300 is in a different half of stitching region 324 than adjacent scan vector end gaps. In this fashion, scan vector end gaps 300 do not overlap within stitching region 312. In another embodiment, shown in FIG. 14, the build strategy parameter modifying may include randomly selecting a position of the plurality of spaced scan vector end gaps 300 between first half 320 and second half 322 of stitching region 312. That is, positions of scan vector end gaps 300 are arbitrarily selected. The selected region within which scan vector modifications are made can be an areal region, a volume or even select scan vector(s).

As noted, embodiments of the disclosure may be applicable to AM systems employing any number of irradiation devices 110, 112, 114, 116, including one. In this regard, certain build strategy parameters are used for both single and multiple irradiation device AM systems. The following description addresses some examples of those build strategy parameters.

With continuing reference to FIG. 14, in another embodiment, the plurality of pre-assigned build strategy parameters 92 (FIG. 2) may include a set of preset scan vector parameters for each layer of object 102. Each set of preset scan vector parameters may include, for example, scan vector spacing, scan vector width, scan vector length, scan vector path, e.g., linear or curved, interior or boundary, etc. In this case, step S10 may include selecting a region including one or more scan vectors 202. That is, the selected region is defined by at least one scan vector used to build object 102 in object code 124O. For example, selected region 324 may be an areal space including a number of scan vectors 202A, 202B, 202X as in FIG. 14, or a single scan vector such as scan vector 202X. In step S12, the selective modifying may include changing at least one scan vector parameter from the set of preset scan vector parameters for the region of the layer of the object. For example, the build strategy parameter modifying may include changing a beam size of at least one irradiation device 110, 112, 114, 116 for the region, e.g., one or more scan vectors 202 in the region, from the plurality of pre-assigned build strategy parameters. Alternatively, a beam size of a single scan vector 202X may be changed (shown wider). FIG. 15 shows another example in which spacing between certain scan vectors 202 (which are selected regions) have been selectively modified, e.g., they are not equally spaced.

Figure 16:
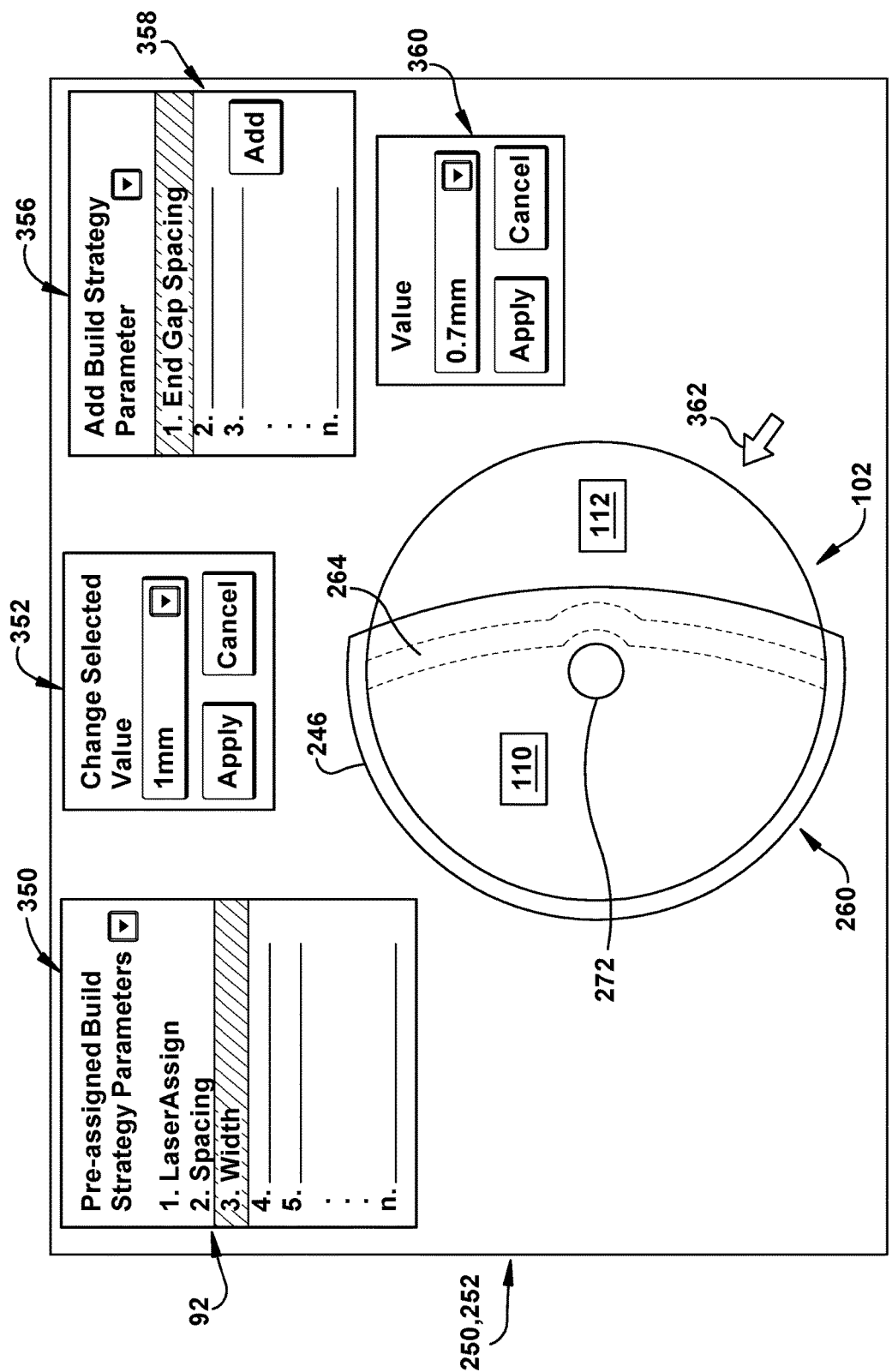
FIG. 16 shows a schematic view of an illustrative interface for selectively adding a build strategy parameter according to embodiments of the disclosure.

Referring to FIG. 16, an illustrative interface 250 in the form of a GUI 252, created by region modifier 90, is shown. In this example, a two dimensional representation of selected region 246 of a layer of an object 102 with, for example, laser assignments, e.g., 110, 112, and stitching region 264, is shown. A dropdown window 350 may provide a list of pre-assigned build strategy parameters 92, e.g., laser assignment (assign), spacing, width, etc., allowing selection of one or more pre-assigned build strategy parameters for modification. An input window 352 may be provided for modifying a selected pre-assigned build strategy parameter 92. In addition, a build strategy parameter add window 356 may be created by region modifier 90 with a list of build strategy parameters 358 that can be added. The list of build strategy parameters to be added 358 may include those not listed in the pre-assigned build strategy parameters 92. An appropriate input window 360 may also be created by region modifier 90 for inputting an appropriate value for the selected additional build strategy parameter(s) 358. A selector 362 may be provided for GUI-based selecting, dragging, reshaping actions, etc., relative to positions of visually rendered and modifiable build strategy parameters such as the position of stitching region 264. It is noted that the example GUI 252 is just one example of a large variety of well understood techniques for modifying and/or adding build strategy parameters.

As will be appreciated by one skilled in the art, embodiments of the present disclosure (e.g., region modifier 90) may be embodied as a system, method or computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present disclosure is described herein with reference to flow diagram illustrations and/or block diagrams of methods, systems and computer program products according to embodiments of the disclosure. It will be understood that each block of the flow diagram illustrations and/or block diagrams, and combinations of blocks in the flow diagram illustrations and/or block diagrams, can be implemented by computer program instructions. These computer program instructions may be provided to a processor of a general purpose computer, special purpose computer (e.g., control system 120 of AM system 100, or region modifier 90), or other programmable data processing apparatus to produce a machine, such that the instructions, which execute via the processor of the computer or other programmable data processing apparatus, create means for implementing the functions/acts specified in the flow diagram and/or block diagram block or blocks. In this regard, each block in the flow diagram or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flow diagram illustration, and combinations of blocks in the block diagrams and/or flow diagram illustration, can be implemented by special purpose hardware-based systems that perform the specified functions or acts, or combinations of special purpose hardware and computer instructions.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flow diagram and/or block diagram block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flow diagram and/or block diagram block or blocks.

The technical advantage of embodiments of the disclosure is to provide a technique to manually selectively modify a selected region of an object in object code used for additive manufacture. This functionality is in contrast to automated systems that change object code for a specific purpose without user intervention. In one embodiment, the present disclosure allows for multiple irradiation devices to work on a single object or portion of an object where the user can specifically define build strategy parameters for the stitching region between the irradiation devices. The user has manual control of, for example, the stitching region locations, stitching characteristics, and balance of work between the multiple irradiation devices. Embodiments of the disclosure also allow for a customization of selected regions defined on a scan vector by scan vector basis. Embodiments of the disclosure are CAD model driven and allow direct scan path editing techniques. The disclosure is applicable to a wide variety of additive manufacturing techniques.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or objects, but do not preclude the presence or addition of one or more other features, integers, steps, operations, elements, objects, and/or groups thereof. "Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately" and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise. "Approximately" as applied to a particular value of a range applies to both values, and unless otherwise dependent on the precision of the instrument measuring the value, may indicate +/−10% of the stated value(s).

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. A computerized method for modifying object code representative of an object to be physically generated layer by layer by a computerized additive manufacturing (AM) system using the object code, the computerized method comprising:

providing an interface to allow a user to manually:
  select a region within the object in the object code, the object code including a plurality of pre-assigned build strategy parameters for the object that control operation of at least two irradiation devices of the computerized AM system, wherein the region includes a stitching region to be created by the at least two irradiation devices and the plurality of pre-assigned build strategy parameters control operation of the at least two irradiation devices of the AM printer relative to the stitching region; and
  selectively modify a build strategy parameter of the plurality of pre-assigned build strategy parameters in the selected region in the object code to change an operation of the computerized AM system from the plurality of pre-assigned build strategy parameters during building of the object by the computerized AM system, wherein the build strategy parameter modifying includes modifying a characteristic of a scan vector end gap among a plurality of spaced scan vector end gaps created by the at least two irradiation devices, each scan vector end gap defined between a first melt pool end of a first scan vector formed by the first irradiation device in the stitching region and a second, abutting melt pool end of a different scan vector formed by the second, different irradiation device in the stitching region, wherein the plurality of spaced scan vector end gaps are alternatingly positioned in the stitching region.

2. The computerized method of claim 1, further comprising using the object code to build the object with the selectively modified build strategy parameter using the computerized AM system.

3. The computerized method of claim 1, wherein the region extends vertically across a plurality of layers of the object, and the selective modifying includes assigning a first position for the stitching region in a first layer of the object, and assigning a second, different position for the stitching region in a second, different layer of the object.

4. The computerized method of claim 3, wherein the first position of the stitching region in the first layer does not overlap with the second, different position of the stitching region in the second, different layer.

5. The computerized method of claim 3, wherein the first position is on a first lateral side of a centerline of the selected region, and the second, different position is on a second, different lateral side of the centerline of the selected region.

6. The computerized method of claim 1, wherein the build strategy parameter selective modifying includes modifying a position of the stitching region in the region of the layer of the object from the plurality of pre-assigned build strategy parameters.

7. The computerized method of claim 1, wherein the build strategy parameter selective modifying includes modifying a size of the stitching region in the region of the layer of the object from the plurality of pre-assigned build strategy parameters.

8. The computerized method of claim 1, wherein the build strategy parameter selective modifying includes modifying a shape of the stitching region in the region of the layer of the object from the plurality of pre-assigned build strategy parameters.

9. The computerized method of claim 1, wherein the build strategy parameter modifying includes modifying a characteristic of a scan vector end gap among a plurality of spaced scan vector end gaps created by the at least two irradiation devices, each scan vector end gap defined between a first melt pool end of a first irradiation device in the stitching region and a second, abutting melt pool end of a second, different irradiation device in the stitching region.

10. The computerized method of claim 9, wherein the stitching region has a centerline defining a first half and a second half of the stitching region in the region, and wherein the build strategy parameter modifying includes alternatingly positioning the plurality of spaced, scan vector end gaps in the first half and the second half of the stitching region.

11. The computerized method of claim 9, wherein the stitching region has a centerline defining a first half and a second half of the stitching region in the region, and wherein the build strategy parameter modifying includes randomly selecting a position of the plurality of spaced scan vector end gaps between the first half and the second half of the stitching region.

12. The computerized method of claim 9, wherein the build strategy parameter modifying includes modifying a size of at least one of the plurality of spaced, scan vector end gaps.

13. The computerized method of claim 1, wherein the plurality of pre-assigned build strategy parameters includes at least one pre-assigned irradiation device assignment for each layer of the object, and
  wherein the selectively modifying includes changing the at least one pre-assigned irradiation device assignment within the region.

14. The computerized method of claim 1, wherein the selected region is defined by one of an areal space within each of at least one layer of the object in the object code, or a volume of the object within the object code.

15. The computerized method of claim 1, wherein the region includes a plurality of regions, and the layer includes a plurality of layers, each region including a selectively modified build strategy parameter.

16. The computerized method of claim 1, wherein the object code includes a layer by layer representation of the object, each layer to be sequentially, physically generated by the computerized AM system.

17. The computerized method of claim 1, wherein the providing occurs at the computerized AM system after the object code is input to the computerized AM system.

18. The computerized method claim 1, wherein the providing occurs at a computer aided design (CAD) system.

19. The computerized method of claim 1, wherein the providing occurs at an additive manufacturing preparation system apart from the computerized AM system.

20. The computerized method of claim 1, wherein selectively modifying the build strategy parameter further includes:
  positioning a first one of the plurality of spaced vector end gaps in a first portion of the stitching region, and
  positioning a second one of the plurality of spaced vector end gaps in a second portion of the stitching region, such that the first one of the plurality of spaced vector end gaps does not overlap with the second one of the plurality of spaced vector end gaps.

21. The computerized method of claim 1, wherein selectively modifying the build strategy parameter of the plurality of pre-assigned build strategy parameters includes re-assigning the first scan vector from the first irradiation device to the second, different irradiation device.

* * * * *